United States Patent [19]

Roskelley

[11] 4,026,681

[45] May 31, 1977

[54] GAS DEHYDRATOR PROCESS

[76] Inventor: Thomas J. Roskelley, 4000 Rasco, Odessa, Tex. 79762

[22] Filed: Dec. 4, 1975

[21] Appl. No.: 637,513

[52] U.S. Cl. ................................. 55/32; 159/31; 203/48

[51] Int. Cl.² ......................................... B01D 53/02

[58] Field of Search ............. 55/31, 32, 29, 83, 84, 55/89, 171–177; 159/31; 203/48, 18

[56] References Cited

UNITED STATES PATENTS

| | | | |
|---|---|---|---|
| 2,988,171 | 6/1961 | Arnold et al. | 55/32 |
| 2,990,910 | 7/1961 | Kimmell | 55/32 |
| 3,648,434 | 3/1972 | Gravis et al. | 55/32 |
| 3,708,955 | 1/1973 | Ambros et al. | 55/31 |
| 3,713,991 | 1/1973 | Thomas | 203/48 |
| 3,824,177 | 7/1974 | Honerkamp et al. | 55/32 X |
| 3,867,112 | 2/1975 | Honerkamp et al. | 55/84 X |

*Primary Examiner*—Frank A. Spear, Jr.
*Assistant Examiner*—E. Rollins Cross
*Attorney, Agent, or Firm*—Marcus L. Bates

[57] ABSTRACT

A gas dehydrator system for removing salty water from natural gas, and thereafter subsequently removing the salt and water from the dehydrating agent. The salty water is removed from the gas in a scrubber. The water is then distilled from the dehydrating agent, leaving a salty dehydrating agent from which the salt is crystallized before the agent is recirculated to the scrubber. This expedient prevents undesired crystallization of salt from occurring within the various components of the system.

9 Claims, 2 Drawing Figures

GAS DEHYDRATOR PROCESS

BACKGROUND OF THE INVENTION

In producing gas wells, or oil wells having an appreciable gas/oil ratio, the gas is usually laden with water. The water must be removed from the gas prior to the entrance of the gas into the sales gas line.

The water is usually extracted from the gas by means of a glycol dehydrator system wherein a contactor or scrubber admits the flow of dry glycol and gas in countercurrent flow relationship therethrough, so that the water is absorbed or scrubbed from the gas. The wet glycol is subsequently distilled; thereby removing most of the water therefrom, and the treated glycol is then recycled to the contactor.

There are instances where the water which is intrained within the gas has an appreciable amount of salts, such as NaCl, dissolved therein. The salt remains suspended in solution as the wet glycol is pumped to the distillation unit, and upon evaporation of water therefrom, the composition of the equilibrium system is changed in a direction whereby the salt component thereof eventually accumulates to become a supersaturated solution. The concentration of the salt component progressively increases until salt crystallization occurs within the system flow lines. This action causes deposition of the crystalline salt within the glycol pump, as well as within some of the colder parts of the system. The deposition of salt within the pump reduces its life and requires periodic maintenance and repairs thereof, which also necessitates reduced well production.

Accordingly, it is desirable to be able to desalt the dry glycol at a location upstream of the pump so that the salt is precipitated or crystallized therefrom at a predetermined location where it can be easily removed from the system.

SUMMARY OF THE INVENTION

This invention comprises process and apparatus for desalting a liquid drying agent flowing within a gas dehydrator system. According to the invention, a contactor apparatus receives salty wet gas and a glycol drying agent which flows in countercurrent flow relationship therethrough, so that the glycol scrubs the salty water from the gas. Hence the salt and water is transferred from the gas into the glycol thereby setting up an equilibrium between the gas, salt, water, and glycol solution.

The spent glycol solution, or drying agent, flows from the contactor to a distillation unit where most of the water is distilled therefrom, thereby changing the composition of the glycol, water, and salt mixture. The glycol next flows from the reboiler of the distillation unit to a pump, carrying the salt therewith as a supersaturated solution of glycol and salt. A desalter is interposed between the distillation unit and the pump, so that the salt is removed therefrom in sufficient quantities to prevent further downstream crystallization of the salt from occurring, especially within the pump means.

In one embodiment of the invention, the desalter comprises a cooler, a filter, and a heater. The cooler reduces the temperature of the drying agent to a value to cause an appreciable quantity of the salt contained therewithin to crystallize; whereupon the crystallized salt can be filtered from the system. Between the filter and the pump there is located the heat exchanger which warms the glycol solution a sufficient amount whereby no further crystallization of salt can occur as the solution flows back to the contactor.

Accordingly, a primary object of this invention is to provide a desalter for a glycol gas dehydrator.

Another object of the invention is to provide a process for removing salt and water from natural gas.

A further object of this invention is to disclose and provide a process for desalting a drying agent for use in conjunction with a glycol dehydrator.

A still further object of this invention is to provide an apparatus for desalting a drying agent which is used in conjunction with a gas dehydrator system.

Another and still further object is the provision of a salt extractor for use in a gas dehydrator system.

These and various other objects and advantages of the invention will become readily apparent to those skilled in the art upon reading the following detailed description and claims and by referring to the accompanying drawings.

The above objects are attained in accordance with the present invention by the provision of both apparatus and process for desalting a drying agent used in conjunction with a glycol dehydrator in a manner substantially as described in the above abstract and summary.

DETAILED DESCRIPTION OF THE PREFERRED EMBODIMENTS

Figure 1:
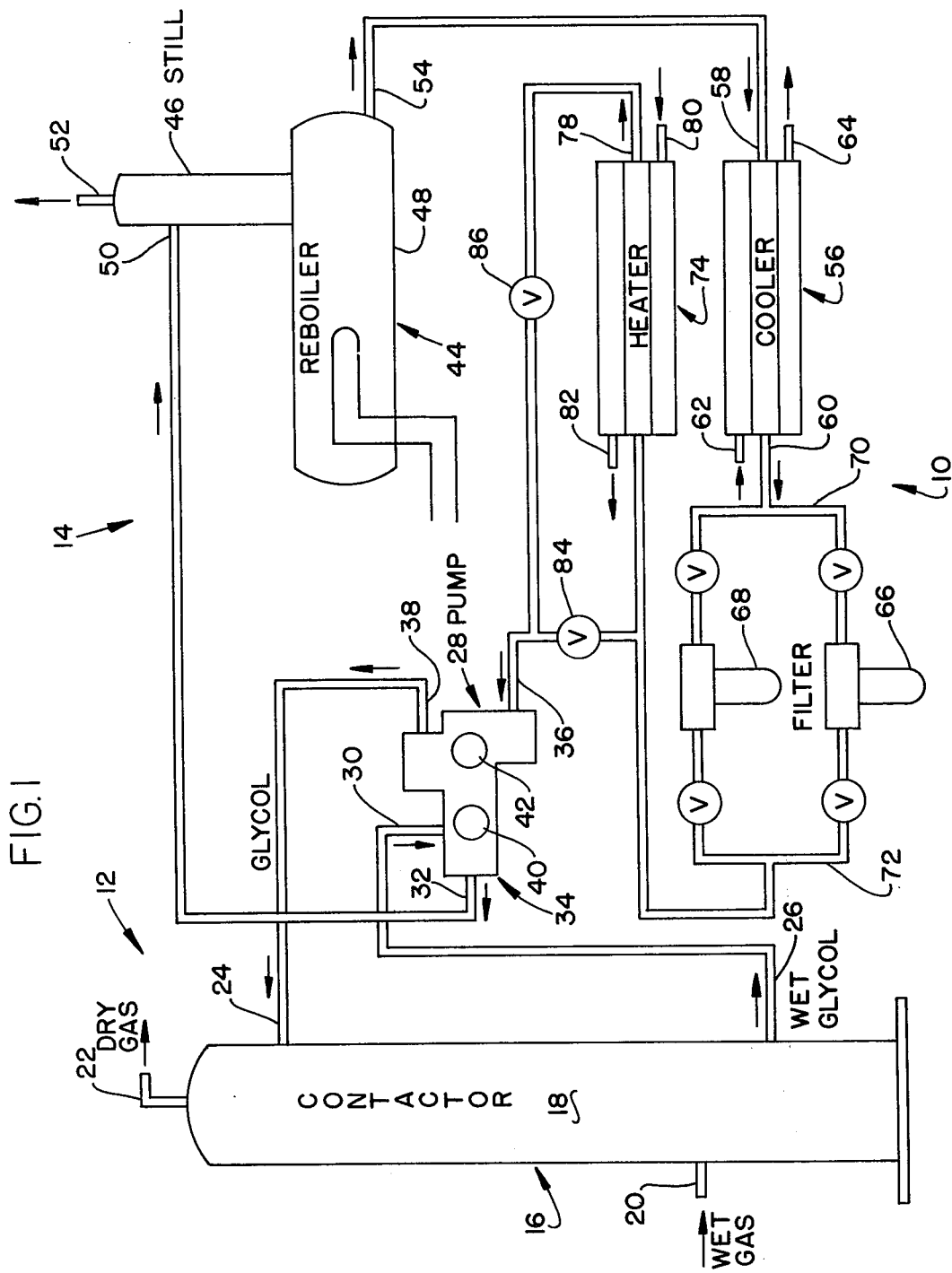
FIG. 1 is a part diagrammatical, part schematical flow sheet which sets forth one form of the present invention; and, FIG. 2 sets forth a more detailed flow sheet which is similar in some respects to the one described in FIG. 1.

In the preferred embodiment of the invention disclosed in FIG. 1 of the drawings, a glycol dehydrating system 10 is comprised of a gas treatment section 12 and a glycol treatment section 14. A conventional gas scrubber 16 includes a contact tower 18 which receives salty wet gas at inlet 20. The gas is scrubbed in such a manner so that treated, dry, desalted gas flows from outlet 22. Glycol inlet 24 provides a supply of treated drying agent for the scrubber and is caused to contact the untreated gas in countercurrent flow relationship therewith so that spent glycol solution exits at the outlet 26.

Pump 28, which can take on any number of different forms, preferably is a PV series Kimray Glycol Energy Exchange Pump, manufactured by Kimray, Inc., 52 Northwest 42nd Street, Oklahoma City, Okla., 73118, as described in their Feb. 5, 1969, catalog. Wet glycol inlet 30 and wet glycol outlet 32 provides flow through the high pressure section 34 of the pump. Dry glycol inlet 36 and dry glycol outlet 38 provides flow through the low pressure section of the pump. Pump pistons 40 and 42 are schematically illustrated in the drawings. Hence, the pump has a first section separated from a second section so that flow occurs along the indicated separate flow paths by using energy available from the wet glycol.

The distillation unit 44 is in the form of an evaporator, and preferably includes a distillation column, or still 46, flow connected to a boiler section, or reboiler 48, in the usual manner so that a separation can be effected between the water, glycol, and salt. The wet glycol inlet is seen at 50 while water is evaporated through outlet 52. The salty glycol outlet 54 is flow connected to the desalter of the present invention.

The desalter, which can take on various different forms, preferably comprises a cooler, a filter, and a heater.

The cooler 56 is provided with a glycol inlet 58, glycol outlet 60, coolant inlet 62, and coolant outlet 64. The coolant is supplied from any suitable and convenient source, including a cool water supply, a refrigerant, or by routing the wet or dry gas supply therethrough.

Filters 66 and 68 are parallel connected by the flow conduits 70 and 72. Valves are provided as illustrated so that either filter can be isolated for servicing.

The heat exchanger 74 of the desalter is provided with inlet 76, outlet 78, and heating inlet and outlet 80 and 82. The exchanger is also provided with suitable valves 84 and 86 by which the exchanger can be either isolated from the system, or partly bypassed. Where deemed desirable, the exchanger 74 can consist of a short loop through the reboiler.

Figure 2:
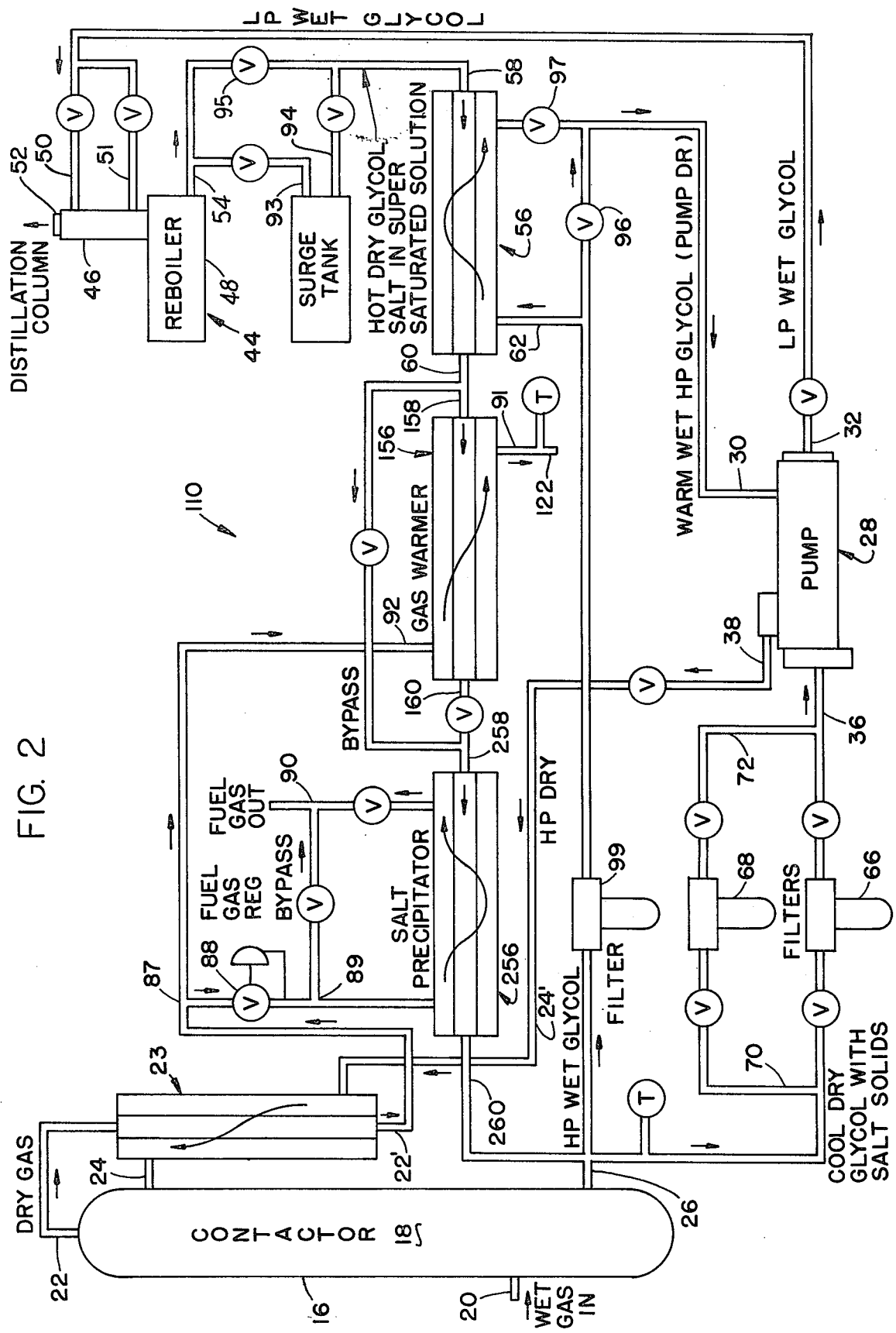

In FIG. 2, wherein like numerals refer to like elements wherever it is possible or logical to do so, the scrubber is connected to a heat exchanger 23 so that the gaseous products flowing therethrough are placed in countercurrent flow relationship respective to the glycol flowing at 24' and 24. This expedient warms the gas while the glycol is cooled, thereby significantly increasing the efficiency of the system.

Exchanger 23 has outlet 22' thereof flow connected to junction 87. Motor valve or regulator 88 controls the flow of gas into the inlet 89 of the secondary side of the heat exchanger 256. The primary side of the last exchanger provides the salt precipitator of the invention. The outlet of the secondary side of exchanger 256 provides a source of fuel gas at 90.

Flow from junction 87 is also connected to inlet 92 of the secondary side of exchanger 156. Outlet 91 of exchanger 156 is connected to the sales gas line 122 and represents the outflow of dry treated gas from the system.

The reboiler 48 is connected to the inlet 93 of a surge tank. Outlet 94 connects the surge tank to exchanger 56. The exchanger is called a glycol pump warmer.

Valve 95, together with its associate valves, controls the flow into or around the surge tank. Valve 97 and 96 enable the secondary side of exchanger 56 to be bypassed. Filter 99 removes debris which may be contributed by the wet gas.

In operation, salty wet gas enters the dehydrator system of FIG. 1 at inlet 20, and flows upwardly through the contact tower where it is scrubbed dry with dry, salt-free glycol. The dry gas exits at 22, and flows on to the sales gas line as moisture-free natural gas. Where deemed desirable, the gas may be diverted through the secondary side of heat exchanger 56.

The salt-free dry glycol is forced by pump section 28 inlet inlet 24 of the scrubber, where it makes intimate contact with the untreated gas, thereby absorbing salt water therefrom. The salty, wet glycol exits at 26 and flows through the power section 34 of the pump. The glycol flows on to the distillation column located above the reboiler, where water is evaporated therefrom, leaving salt, a trace of moisture, and glycol solution flowing at 54. The salty glycol solution is reduced in temperature by heat exchanger 56 so that crystallization of salt from the super-saturated salt solution occurs therewithin. The crystallized salt is removed by filters 66 or 68 depending upon the valve configuration.

The composition of the solution within the scrubber therefore commences at each extremity thereof as relatively dry glycol having a minimum of salt therein at 24, salt-free dry gas at 22, wet gas at 20, and salty, wet glycol at 26.

The reboiler and still change the composition of the salt, water, and glycol mixture by evaporation, wherein water is eliminated at 52, while a glycol and salt solution remain in the flow system at 54. Eventually the concentration of the salt which is contained within the glycol will reach a value where further cooling provides a super-saturated solution. Hence, change in temperature of the glycol at the cooler 56 produces a condition of lower solubility and causes salt crystallization to occur.

In the more specific embodiment of the invention disclosed in FIG. 2, the drying agent enters the scrubber at 24 in the before described manner and exits at 26, where it is filtered at 99, is warmed at 56, and provides power for the pump 28 by flowing through the first or power section 30, 32. The glycol exits the pump at 32 and flows through the distillation column where the moisture is evaporated therefrom. The hot, salty glycol enters the surge tank and is returned to inlet 58 of the pump warmer. From the pump warmer the glycol flows through the gas warmer 156 where it is further cooled, and then continues on through the crystallizer or desalter 256, so that an appreciable amount of salt is crystallized therefrom. The salt crystals are removed by filter 68 or 66 and the remaining concentration of salt contained within the glycol cannot precipitate out because the pump is heated by exchanger 56.

The glycol at 36 is therefore warmed as it is forced through the secondary section of the pump because of heat transfer with the spent glycol glowing through the primary section of the pump. The treated drying agent exits the pump at 38 and flows through the heat exchanger 23 and back into the scrubber at 24.

The present invention can be used to advantage in natural gas dehydration by utilizing drying agents, which include ethylene or tri-ethylene glycol. The crystallizer can take on several different forms and can be provided with a filter and a scraper if deemed desirable; however it is preferred that a simple heat exchanger and filter system be used which can be rapidly disassembled and the salt easily removed therefrom.

There are crystallizers available such as the Swenson-Walker Crystallizer and the Wulff-Bock Crystallizers which have stirring or rocking action for agitation. Other crystallizers are available which are provided with spiral scrapers in the form of augers for removal of crystalline substances therefrom.

The present invention precipitates salt from a glycol dehydrating agent and removes the solid salt from the system. The precipitation is attained by reduction of the glycol temperature. The resultant solids are removed by filtration. This expedient improves the action of the scrubber by increasing the absorption of salty water therein, and furthermore prevents damage to the glycol pump as well as avoiding unwanted salt accumulation within the system.

I claim:

1. Method of desalting a gas dehydrator system wherein salty wet gas is scrubbed in a contacting tower with a drying agent to remove moisture and salt therefrom comprising the steps of:
1. removing salt water from the salty moist gas by contacting the salty wet gas with a dehydrating agent;
2. removing the water from the salty wet agent by flowing the salty wet agent into a distillation unit and effecting a separation between the water and the agent, thereby leaving a salt containing agent;
3. reducing the temperature of the salt laden agent to a value to cause crystallization of some of the salt to occur;
4. filtering the crystallized salt from the agent; and,
5. pumping the desalted agent back into the contacting tower.

2. Process of claim 1 wherein the step of crystallization is carried out by flowing cold dry gas from contact tower through the secondary side of a heat exchanger, and flowing the drying agent through the primary side of the heat exchanger to thereby reduce the temperature of the agent.

3. Process of claim 2 and further including the step of raising temperature of the agent downstream of the heat exchanger and upstream of pump, to thereby prevent salting the pump.

4. The method of claim 1 wherein crystallization is attained by flowing the dry gas from the contact tower and said drying agent in countercurrent flow relationship respective to one another through a heat exchanger to thereby reduce the temperature of the drying agent;
and further including the step of raising the temperature of the drying agent at a location downstream of the last said heat exchanger and upstream of said pump to thereby prevent salt from accumulating within said pump.

5. A process for a gas dehydrator which employs a glycol dehydrating agent for removing salty water from salt, moist natural gas and thereafter the salt and the water are removed from the dehydrating agent comprising the steps of:
removing salt water from a stream of salty, moist gas by contacting the salty, moist gas with glycol, thereby providing a stream of relatively salt-free dry gas and a stream of salty, wet glycol;
removing water from the salty, wet glycol by flowing the salty, wet glycol through a distillation unit to effect separation between the water and the salty, wet glycol; thereby leaving a stream of glycol which contains salt therein;
flowing the stream containing salt and glycol through a heat exchanger until the temperature of the salty glycol reaches a value to cause crystallization of a substantial amount of the salt therefrom;
removing the crystallized salt from the agent to provide a relatively salt-free dry glycol drying agent; and,
pumping the salt-free dry glycol back into contact with the salty, moist natural gas.

6. The process of claim 5 wherein the crystallization step is carried out by flowing cold, dry gas from the contacting step through said heat exchanger to thereby enable the stated reduced temperature of the salty glycol to occur.

7. The process of claim 5 wherein said salt-free dry glycol is heated before the pumping step to assure that no additional salt crystallizes from the glycol during the pumping step.

8. The process of claim 5 wherein the crystallized salt is removed by employing a filter means upstream of the pumping step, and further including the step of heating the salt-free dry glycol downstream of the filter and upstream of the pumping step to thereby dissolve any crystals of salt which may be present therein.

9. The process of claim 5 wherein said salt-free dry glycol is heated before the pumping step to assure that no additional salt crystallizes from the glycol during the pumping step;
the crystallized salt is removed by employing a filter means upstream of the pumping step, and further including the step of heating the salt-free dry glycol downstream of the filter and upstream of the pumping step to thereby dissolve any crystals of salt which may be present therein.

* * * * *